United States Patent [19]
Breitenhuber et al.

[11] Patent Number: 5,592,807
[45] Date of Patent: Jan. 14, 1997

[54] BEARING ARRANGEMENT FOR AN OPEN-END SPINNING ROTOR

[75] Inventors: Josef Breitenhuber, Buxheim; Erich Bock, Wettstetten; Gallus Lindner, Haunstetten; Manfred Knabel, Ingolstadt, all of Germany

[73] Assignee: Rieter Ingolstadt Spinnereimaschinenbau AG, Ingolstadt, Germany

[21] Appl. No.: 442,014

[22] Filed: May 16, 1995

[30] Foreign Application Priority Data

Jul. 6, 1994 [DE] Germany ............ 44 23 605.0

[51] Int. Cl.⁶ .................................. D01H 4/00
[52] U.S. Cl. .............................. 57/406; 57/400
[58] Field of Search ............... 384/549; 57/400, 57/406, 407, 414

[56] References Cited

U.S. PATENT DOCUMENTS

| | | | |
|---|---|---|---|
| 3,779,620 | 12/1973 | Stahlecker | 57/406 |
| 3,805,506 | 4/1974 | Stahlecker | 57/406 |
| 3,813,133 | 5/1974 | Walter et al. . | |
| 3,838,560 | 10/1974 | Stahlecker | 57/406 |
| 3,938,863 | 2/1976 | Victor et al. . | |
| 4,103,479 | 8/1978 | Stahlecker et al. . | |
| 4,667,464 | 5/1987 | Stahlecker | 57/406 |
| 4,773,210 | 9/1988 | Landwehrkamp et al. | 57/406 |
| 4,916,891 | 4/1990 | Landwehrkamp et al. . | |
| 5,450,718 | 9/1995 | Knabel et al. | 57/406 |

FOREIGN PATENT DOCUMENTS

| | | |
|---|---|---|
| 0435016A2 | 7/1991 | European Pat. Off. . |
| 2139768 | 8/1973 | Germany . |
| 2632976 | 1/1978 | Germany . |
| 2902820 | 8/1980 | Germany . |
| 4022562A1 | 1/1982 | Germany . |
| 3942612A1 | 6/1991 | Germany . |
| 1244704 | 9/1971 | United Kingdom . |

*Primary Examiner*—William Stryjewski
*Attorney, Agent, or Firm*—Dority & Manning

[57] ABSTRACT

An open-end spinning device has a spinning rotor with a rotor pot defining a fiber collection groove therein. A rotor shaft is provided having a diameter between 5.5 mm and 9 mm. Pairs of rotatable supporting rings supported on axles define a nip therebetween. The rotor shaft is rotatably supported in the nip. The supporting rings have a diameter between 62 mm and 82 mm. A thrust imparting device imparts an axial thrust to the rotor shaft in the direction opposite the rotor pot. A non-contacting axial bearing is disposed opposite the free end of the rotor shaft for absorbing the axial thrust without contacting the rotor shaft. The axial thrust imparting device generates an axial thrust between 1N and 7N on the rotor shaft. A driving device contacts the rotor shaft for rotatably driving the rotor and has a contact pressure with the rotor shaft from between 8N and 39N.

15 Claims, 3 Drawing Sheets

BEARING ARRANGEMENT FOR AN OPEN-END SPINNING ROTOR

BACKGROUND OF THE INVENTION

The present invention relates to an arrangement of bearings for an open-end spinning rotor of an open-end spinning device which is radially supported with its shaft in the nip of supporting rings and which bears on an axial bearing. From EP 0 435 016 A2 and also from DE 40 22 562 A1, such an arrangement of bearings is known. To produce the axial thrust, the axes of the supporting rollers are in a known manner not parallel with the rotor shaft but are placed at an angle to it, as is known for example from DE-A 21 12 913. In other arrangements of bearings known from DE-A 20 61 520 and DE-A 19 01 453, the axial thrust on the rotor shaft is produced in that the driving device, e.g. a tangential belt or a drive wheel, is installed at an angle relative to the axis of the rotor shaft.

It is a disadvantage of the known arrangements of bearings that a great expenditure of energy is required to operate them and that the operation causes great wear on the supporting rings and on the rotor shaft. A considerable portion of the energy consumption of such an arrangement of bearings is caused by the coiling conditions of the rotor shaft on the supporting rings. The production of the axial thrust by the supporting rings or the driving device causes slip between these and the rotor shaft. The state of the art, with respect of determining the axial thrust, has assumed that the rotor shaft bears upon a step bearing which constitutes a fixed support. Such a fixed support is shown for example in DE-A 21 12 913 or also in U.S. Pat. No. 4,916,891, where the support of the rotor shaft is effected by means of a ball against which the rotor shaft bears. This results in wear of the ball and shaft. With such axial arrangements of bearings in combination with the production of the axial thrust on the spinning rotor by means of the bearing elements or the driving device, the danger exists that axial oscillations of the rotor shaft due to the hard, elastic support at the axial bearing cause the rotor to leave its position and to run up against the cover of its rotor housing. In order to prevent this, the state of the art has seen to it, through a relatively sharp angle position of the supporting ring axes or of the driving device or through strong pressure of the rotor shaft against the supporting rings, e.g. by means of the driving devices or through appropriate sizing of the supporting rings and of the rotor shaft, that a strong axial thrust is exerted in the direction of the axial bearing upon the rotor shaft, so that the spinning rotor maintains its axial position. As a result, the crossing of the supporting rings in combination with the contact pressure of the driving device and the laying conditions of the rotor shaft in the nip of the supporting rings, as well as the frictional conditions between the supporting rings or driving device and the rotor shaft, has led to axial thrusts of over 8N. This value constitutes the measure of energy consumption which applies in addition to normal bearing friction.

OBJECTS AND SUMMARY OF THE INVENTION

It is a principal object of the instant application to design an arrangement of bearings for a spinning rotor of an open-end spinning device in such a manner that the disadvantages of the state of the art are avoided. In particular the arrangement of bearings is designed so that the spinning rotor can be run securely radially and axially, so that the arrangement of bearings requires less energy and is exposed to less wear if possible.

Additional objects and advantages of the invention will be set forth in part in the following description, or may be obvious from the description or may be learned through practice of the invention.

The design of the bearing arrangement according to the invention reduces energy consumption of the bearing considerably by comparison with the known bearing arrangements. The low axial thrust causes the slip between rotor shaft and the elements of the rotor bearing interacting with it to be reduced. This results in lower energy consumption in the operation of the rotor bearing arrangement. Thanks to the reduction of axial thrust, the forces acting upon the axial bearing are also reduced, so that less energy is needed to provide the axial support. Thus, for example, low air pressure is sufficient in a pneumatically operated axial bearing, to produce the necessary axial supporting forces. Low air pressure results in less air thru-put, so that energy and costs in the production and availability of compressed air are the desired results. If a magnet bearing is used, smaller magnets can advantageously be used. An axial thrust between 1N and 7N (N=Newton) ensures that the spinning rotor can nevertheless be held securely in its axial position. It is especially advantageous if the bearing arrangement is introduced with an axial thrust within a range from 2.5N and 5N, so that the bearing arrangement is especially economical in energy consumption and at the same time can be designed so as to be secure with respect to the axial positioning of the rotor shaft. It is especially advantageous if the supporting rings have a diameter between 73 mm and 81 mm. This size makes it possible for the dimensions of the nip receiving the rotor shaft to be designed especially advantageously for secure support. The result is that sufficiently strong contact pressure can be exerted upon the spinning rotor by the driving device in order to hold the shaft radially and securely on the supporting rings and to be able to drive the rotor securely. The spinning rotor is securely supported radially and a low-friction support is made possible at the same time.

The configuration of the rotor shaft with a diameter of more than 7.8 mm results in especially favorable conditions for the interaction between supporting rings, rotor shaft and driving device, in particular in combination with the above-mentioned supporting ring diameters. An exact adjustment of the axial thrust upon the rotor shaft is thereby made possible. The embodiment of the bearing arrangement according to the invention, with an aerostatic axial bearing, results in a bearing arrangement that is especially wear resistant and requires especially little maintenance. Advantageously, the distance between the axial bearing and the end of the rotor shaft is here set between 3 μm and 12 μm, so that safe and contact-free operation of the axial bearing is provided. At the same time the energy consumption is low due to a low consumption of air. It is even more advantageous in this case to set the distance within a range from 6 μm to 9 μm. In general the utilization of a pneumatic axial bearing has also the advantage that no special construction changes are required on the rotor shaft and a wear-free axial support is achieved.

By using a magnetic bearing as the axial bearing, a bearing arrangement which is especially low cost in operation is created. Advantageously, the distance between the free end of the rotor shaft and the axial bearing is set in the range between 0.1 mm and 2 mm. Thus a sufficient gap exists between the end of the rotor shaft and the bearing arrangement so that the operation of the bearing arrangement is free of wear and is possible with little axial thrust and therefore little energy consumption. By using a regulated magnetic bearing which controls the axial force by means of a control unit as a function of the deviation of the distance between rotor shaft and bearing arrangement from the desired value, the bearing arrangement can be operated with especially low axial thrust so that wear and energy consumption of the bearing are very low.

DETAILED DESCRIPTION OF THE PREFERRED EMBODIMENTS

Figure 1:
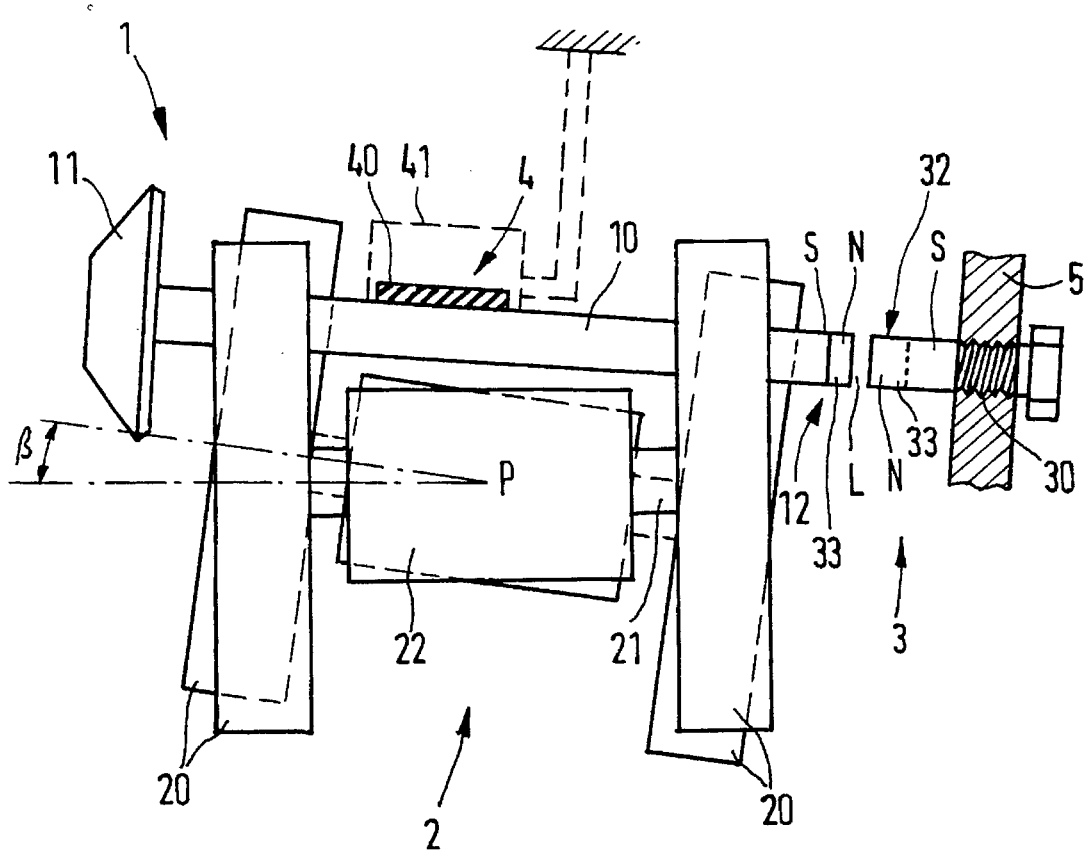
FIG. 1 shows a bearing according to the invention, with a magnetic axial bearing in a side view.

Reference will now be made in detail to the presently preferred embodiments of the invention, one or more examples of which are illustrated in the drawings. Each example is provided by way of explanation of the invention, and not meant as a limitation of the invention. In fact, it will be apparent to those skilled in the art that various modifications and variations can be made in the invention without departing from the scope and spirit of the invention. Also, the numbering of components is consistent throughout the drawings and specification, with the same components having the same number throughout.

FIG. 1 shows an open-end spinning rotor 1 supported in the nip of supporting rings 20 arranged in pairs. At its free end 12 the open-end spinning rotor 1 bears upon an axial bearing 3. In rotation the spinning rotor 1 is offset by the driving device 4 which is a drive belt 40 applied on the shaft which drives the shaft tangentially. The drive can just as well be provided by means of a driving wheel known from the state of the art. The latter also touches the rotor shaft 10 radially and transmits its rotation tangentially. The axial positioning of the spinning rotor 1 is effected in that an axial force is exerted by the supporting ring 20 during rotation on the rotor shaft supported on the axial bearing 3.

Every two supporting rings 20 are provided with a common axle 21 on which they are attached. The axle 21 of the supporting rings 20 is mounted in a supporting ring bearing 22. The supporting ring bearing 22 is held in a bearing block of the rotor spinning machine which is not shown. With the bearing arrangement of FIG. 1, the two axles of the four supporting rings, are inclined towards each other. This has as a consequence that the axle of the rotor shaft is at an angle relative to the two axles of the supporting rings, i.e. that the axle of the rotor shaft is not parallel with either of the supporting ring axles and does not intersect either axle. This has as a consequence that as the rotor shaft 10 rotates, it is subjected to a force in the axial direction. Depending on the direction of rotation of the rotor shaft, a force in the direction of the rotor pot 11 or a force in the direction of the free end 12 of the open-end spinning rotor can be produced. In practice, only a direction of rotation of the open-end spinning rotor where the latter is subjected to this force in the direction of its free end 12 is considered, since the force can be absorbed only by the axial bearing 3 at its free end 12. The crossing of the supporting ring axles 21 is obtained by swiveling around point P in a plane running through the supporting ring axles 21 and lying parallel with the plane of the drawing of FIG. 1 The angle B around by which the two supporting rings are placed at an angle relative to each other is an angle of 0°45' in the embodiment of FIG. 1. The angle B has been drawn considerably larger in the drawing of FIG. 1 for the sake of clarity. The angle may be between generally 0°15' and 0°45'. This orientation of the supporting ring axles relative to each other results in a wry position of the rotor shaft relative to either of the two supporting ring axes. This produces an axial thrust in a known manner upon the rotor shaft during the rotation of supporting rings and rotor shaft.

The axial force with which the open-end spinning rotor 1 is pressed against its axial bearing 3 during operation is set by the inclined position of the axles 21 of the supporting rings 20 together with the contact pressure of the drive belt 40 acting radially upon the rotor shaft. The effect of the driving device 4 with respect to the axial thrust depends here, in addition to the contact pressure upon the rotor shaft, also on the frictional value between rotor shaft and the running surfaces of the supporting rings 20. In the present embodiment of the bearing arrangement and based on the minimal inclination of the supporting rings, an axial thrust of 5N can be set without causing the pressure of the drive belts against the rotor shaft to become too weak. This can be achieved with a belt pressure against the rotor shaft of approx. 18N, whereby supporting disks with a diameter of approximately 70 mm are used.

The axial bearing 3 is made in the form of a magnetic axial bearing 32 with magnets 33 installed on the free end 12 of the rotor shaft 10 and on the bearing support 30. Since their positions are such that equal poles face each other, in this case two north poles (N), a bearing gap is maintained between the bearing support 30 and the free end 12 of the rotor shaft 10, since magnets positioned in this manner repel each other. The bearing support 30 is adjustable, in this case being made in the form of a screw, and is installed in the receptacle 5 of the machine. The bearing gap L between the two magnets 33 of the magnetic axial bearing 32 has a width of 1 mm in the axial direction in the embodiment of the invention shown in FIG. 1. The magnetic axial bearing 32 shown is made with two permanent magnets 33, but it is equally possible to make the axial bearing 3 in the form of a controlled magnetic axial bearing, such as described in DE 40 22 562 A1, for example. Thereby the axial thrust produced can be further reduced, e.g. by means of less pronounced crossing of the supporting rings, so that even less energy is transformed into friction.

Figure 2:
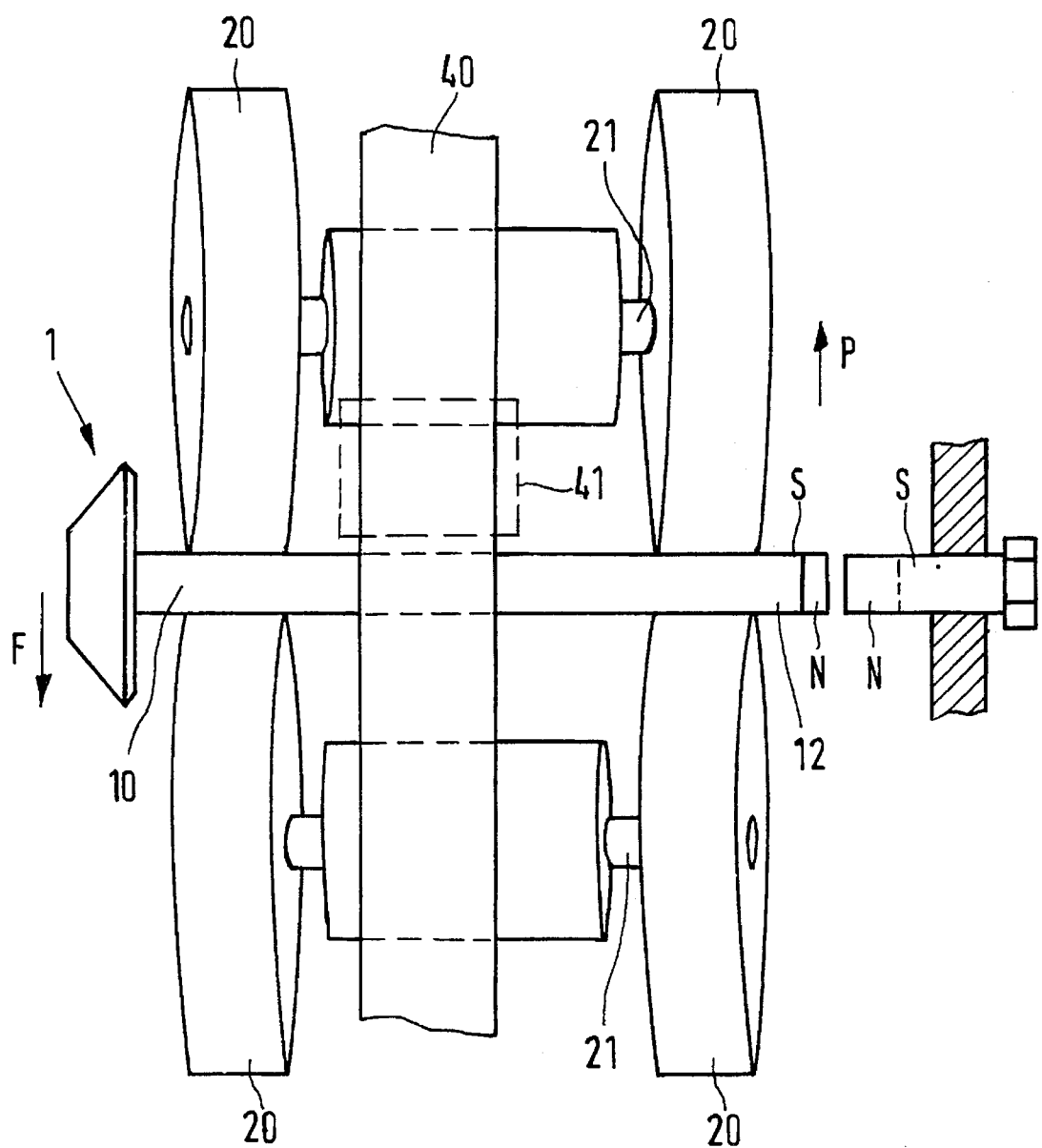
FIG. 2 shows a top view of the bearing of FIG. 1.

FIG. 2 shows a top view of the bearing arrangement of FIG. 1. In this drawing the inclined position of the axles 21 of the supporting rings 20 can be recognized in that the faces of the supporting rings 20 are readily visible. The axis of the rotor shaft is not parallel with the axes of the supporting rings in this projection. The free end 12 of the rotor shaft is offset by a short distance in the direction of arrow P, the open-end spinning rotor 1 by a corresponding distance in the direction of arrow F. This is not shown in FIG. 2 for the sake of simplification. The drive belt 40 runs towards the rotor shaft 10 at an angle of less than 90°, so that it does not cause any axial thrust to be built up on the rotor shaft. The drive belt 40 driving the open-end spinning rotor 1 is subjected to pressure in proximity of the rotor shaft 10 by means of a pressure device 41 which is made in a known manner in the form of a belt roll. The contact pressure of the pressure device or of the drive belt 40 upon the rotor shaft, together with the size of the supporting rings, the distance between the supporting ring axes and thereby of the configuration of the nip, the inclination of the supporting disks and their frictional value relative to the rotor shaft determine the axial thrust exerted upon the rotor shaft 10. The contact pressure of the pressing device 41 can however not be set low at will, since this would lead to the danger that the spinning rotor may leave the nip of the supporting rings during operation, in particular during braking or acceleration, or that the rotor oscillates excessively in operation. However, the design of the rotor bearing arrangement according to the invention ensures that with sufficient pressure exerted by the pressing device 41 upon the rotor shaft 10, favorable rotation behavior of the spinning rotor in its bearing arrangement can be achieved.

Figure 3:
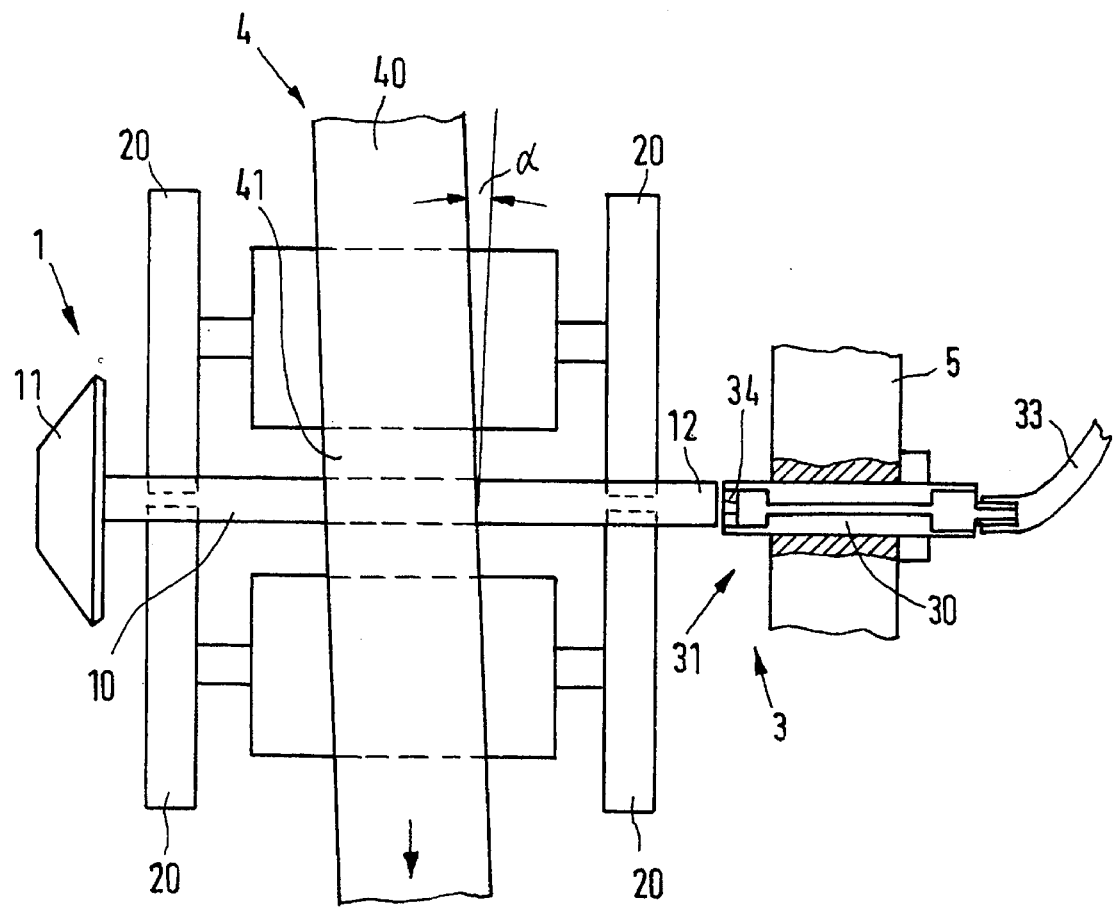
FIG. 3 shows a top view of a bearing with tangential belt placed at an angle and with aerostatic axial bearing.

FIG. 3 shows a top view of a bearing arrangement for an open-end spinning rotor 1 with inclined drive belt 40. The angle a describes the angle position of the drive belt 40 by comparison to the perpendicular upon the axis of the rotor shaft 10. In the embodiment of FIG. 3 an angle of 0°45' is used, so that an axial thrust of 4N can be obtained.

The axial support of the rotor shaft 10 is by means of an aerostatic axial bearing. The free bearing gap between the free end 12 of the rotor shaft 10 and the bearing plate 34 of the aerostatic axial bearing 31 is 5 μm in operation of the spinning rotor. For this compressed air is guided in a known manner into the bearing gap via the air feeding channel 33 and through the bearing support 30. The advantageous design of the bearing arrangement, with the low axial thrust according to the invention, makes it possible to keep air consumption of the aerostatic axial bearing 31 very low. Also, the friction loss between the drive belt 40 and the rotor shaft 10 is low. An axial frictional component through the supporting rings 20 does not exist, since they are not crossed. The inclined drive belt 40 can be replaced by a suitably inclined driving disk such as is known from the state of the art.

Figure 4:
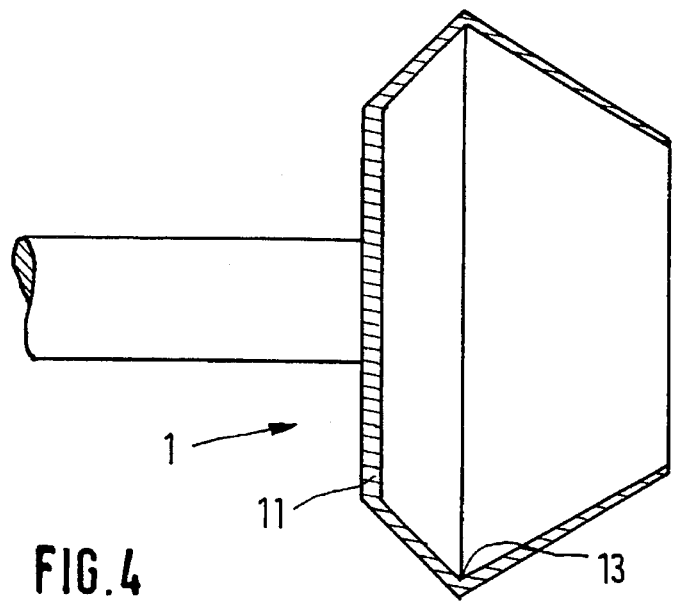
FIG. 4 shows a section through a spinning rotor.

The spinning rotor 1 of FIG. 4 is shown in a section. This is a thin-walled spinning rotor 1, the rotor pot 11 of which was produced e.g. by forming a thin-walled piece of sheet metal. By its rotor shaft it can be connected by means of soldering, or e.g. by means of flat springs. For spinning operation, the diameter of the fiber collection groove 13 is a determining factor. It has a wall thickness between 0.8 and 1.0 mm. The slight thickness of the wall of the spinning rotor has an especially favorable effect on energy consumption during operation of the spinning rotor. This is because the thin wall makes it possible to use a spinning rotor made of steel or aluminum with a much smaller outside diameter than is normally possible with spinning rotors made of steel or aluminum. Because of this the air resistance is much lower during operation, whereby additional drive energy can be advantageously saved when a thin-walled spinning rotor is used. The thickness of the sides of the rotor pot can be advantageously within the range from 0.6 mm to 1.2 mm, whereby the rotor pot can be lathed from a solid piece. It is especially advantageous if the rotor pot is made with a side thickness between 0.8 mm and 1.0 mm.

It will be apparent to those skilled in the art that various modifications and variations can be made in the present invention without departing from the scope or spirit of the invention. For example, features illustrated or described as part of one embodiment can be included in another embodiment to yield a still further embodiment. It is intended that the present invention cover such modifications and variations as come within the scope of the appended claims and their equivalents.

We claim:

1. An open end spinning device, comprising:
a spinning rotor having a rotor pot with a fiber collection groove defined therein and a rotor shaft having a diameter between 5.5 mm and 9 mm;
pairs of rotatable supporting rings supported on axles and defining a nip therebetween, said rotor shaft rotatably supported in said nip, said rings having a diameter between 62 mm to 82 mm, and said axles crossed with respect to each other at an angle of generally between 0 degrees 15 minutes and 0 degrees 45 minutes, thereby imparting an axial thrust to said spinning rotor in a direction opposite said rotor portion of the rotor shaft as said spinning rotor is rotatably driven in said nip;
a non-contacting axial bearing opposite an end of said rotor shaft for absorbing said axial thrust without contacting said rotor shaft, said axial thrust imparted to said spinning rotor between 1N and 7N on said rotor shaft; and
a driving device contacting said rotor shaft for rotatably driving said rotor, said driving device having a contact pressure with said rotor shaft from a value of 8N to 39N.

2. The device as in claim 1, wherein said axles are crossed at an angle of less than 0 degrees 30 minutes.

3. The device as in claim 1, wherein said axial thrust exerted upon said rotor shaft has a value between 2.5N and 5N.

4. The device as in claim 1, wherein said supporting rings have a diameter between 72 mm and 81 mm.

5. The device as in claim 1, wherein said rotor shaft has a diameter of greater than 7.8 mm.

6. The device as in claim 1, wherein said axial bearing comprises an aerostatic axial bearing.

7. The device as in claim 1, further comprising a distance of 3 um and to 12 um between said end of said rotor shaft and said axial bearing.

8. The device as in claim 7, wherein said axial distance is from 6 um to 9 um.

9. The device as in claim 1, wherein said axial bearing is a magnetic bearing.

10. The device as in claim 9, further comprising a distance of 0.1 mm to 2 mm between said end of said rotor shaft and said axial bearing.

11. The device as in claim 1, wherein said spinning rotor has a diameter of 28 mm to 35 mm in the area of said fiber collection groove, whereby said contact pressure of said driving device is from 8N to 30N.

12. The device as in claim 1, wherein said spinning rotor has a diameter of greater than 35 mm in the area of said fiber collection groove, whereby said contact pressure of said driving device is from 15N to 39N.

13. The device as in claim 1, wherein said spinning rotor has a diameter of less than 28 mm in the area of said fiber collection groove, whereby said contact pressure of said driving device is less than 18N.

14. The device as in claim 1, wherein said rotor pot comprises a wall thickness from 0.6 mm to 1.2 mm.

15. The device as in claim 14, wherein said rotor pot is formed from sheet metal.

* * * * *